Patented Nov. 13, 1928.

1,691,532

UNITED STATES PATENT OFFICE.

OSKAR SPENGLER, OF DESSAU IN ANHALT, GERMANY, ASSIGNOR TO I. G. FARBENINDUSTRIE AKTIENGESELLSCHAFT, OF FRANKFORT, GERMANY.

SOLDER FOR ALUMINUM.

No Drawing. Application filed July 13, 1925, Serial No. 43,399, and in Germany September 24, 1924.

Most solders for aluminum suffer from the defect that between them and the aluminum to be soldered there is a considerable difference of electric potential, so that the part soldered suffers rapid corrosion. For obtaining a permanent aluminum joint therefore it is necessary that the difference of potential should be so small that the phenomenon of corrosion becomes negligible.

According to this invention this defect is minimized by the use of alloys of aluminum and silicon as solder for aluminum. Preferably an alloy which contains 5–15% of silicon is applied. The difference of electric potential between such alloys and pure aluminum is remarkably small. Originally it is only −0.07 volt, and by long sojourn in the electrolyte it becomes still smaller, and after 24 hours passes to positive and then remains substantially unchanged at +0.04 to +0.05 volt. Correspondingly with this small difference soldered joints produced with an alloy of aluminum and silicon as solder show considerable stability in damp air or in salt solutions, etc.

What I claim is:—

1. As a solder for aluminum, an alloy comprising about 85–95% aluminum and about 5–15% of silicon.

2. A process for soldering aluminum surfaces which comprises applying to the surfaces a molten flux comprising about 85–95% aluminum and about five to fifteen percent silicon.

In testimony whereof I affix my signature.

OSKAR SPENGLER.